United States Patent
Wikene et al.

(10) Patent No.: US 12,527,884 B2
(45) Date of Patent: Jan. 20, 2026

(54) USE OF CYCLODEXTRINS AS A RADIOSTABILIZER

(71) Applicant: GE Healthcare Limited, Buckinghamshire (GB)

(72) Inventors: Kristine Opsvik Wikene, Nydalen (NO); Imtiaz Ahmed Khan, Buckinghamshire (GB); Graeme McRobbie, Buckinghamshire (GB)

(73) Assignee: GE Healthcare Limited, Buckinghamshire (GB)

( * ) Notice: Subject to any disclaimer, the term of this patent is extended or adjusted under 35 U.S.C. 154(b) by 569 days.

(21) Appl. No.: 17/770,908

(22) PCT Filed: Oct. 21, 2020

(86) PCT No.: PCT/EP2020/079659
§ 371 (c)(1),
(2) Date: Aug. 2, 2022

(87) PCT Pub. No.: WO2021/078814
PCT Pub. Date: Apr. 29, 2021

(65) Prior Publication Data
US 2022/0409752 A1 Dec. 29, 2022

(30) Foreign Application Priority Data
Oct. 21, 2019 (GB) ..................... 1915206

(51) Int. Cl.
*A61K 51/04* (2006.01)
*A61K 47/10* (2017.01)
*A61K 47/22* (2006.01)
*A61K 47/40* (2006.01)

(52) U.S. Cl.
CPC .......... *A61K 51/0459* (2013.01); *A61K 47/10* (2013.01); *A61K 47/22* (2013.01); *A61K 47/40* (2013.01)

(58) Field of Classification Search
CPC .... A61K 51/0459; A61K 47/10; A61K 47/22; A61K 47/40; A61K 51/00; A61K 51/06; A61K 51/0427; A61K 51/121; C07B 59/00
See application file for complete search history.

(56) References Cited

U.S. PATENT DOCUMENTS

| | | |
|---|---|---|
| 4,714,605 A | 12/1987 | Feld et al. |
| 5,026,913 A | 6/1991 | McBride et al. |
| 5,300,280 A | 4/1994 | DeRosch et al. |
| 5,993,776 A | 11/1999 | Pasqualini et al. |
| 6,056,941 A | 5/2000 | Schramm et al. |
| 6,172,207 B1 | 1/2001 | Damhaut et al. |
| 7,344,702 B2 | 3/2008 | Casebier et al. |
| 7,642,373 B2 | 1/2010 | Wadsworth et al. |
| 7,824,659 B2 | 11/2010 | Casebier et al. |
| 8,226,929 B2 | 7/2012 | Casebier et al. |
| 8,936,777 B2 | 1/2015 | Cesati et al. |
| 9,061,996 B2 | 6/2015 | Mantzilas et al. |
| 9,161,997 B2 | 10/2015 | Casebier et al. |
| 9,408,927 B2 | 8/2016 | Robinson et al. |
| 9,550,000 B2 | 1/2017 | Robinson et al. |
| 9,603,951 B2 | 3/2017 | Lazewatsky et al. |
| 9,682,944 B2 | 6/2017 | Lehmann et al. |
| 9,687,571 B2 | 6/2017 | Castner et al. |
| 9,713,651 B2 | 7/2017 | Cesati et al. |
| 9,718,786 B2 | 8/2017 | Casebier et al. |
| 9,919,064 B2 | 3/2018 | Cesati et al. |
| 10,022,462 B2 | 7/2018 | Cesati et al. |
| 10,125,106 B2 | 11/2018 | Casebier et al. |
| 10,331,146 B2 | 6/2019 | Rhodes et al. |
| 10,500,293 B2 | 12/2019 | Cesati et al. |
| 10,568,978 B2 | 2/2020 | Cesati et al. |
| 10,842,892 B2 | 11/2020 | Castner et al. |
| 10,889,550 B2 | 1/2021 | Casebier et al. |

(Continued)

FOREIGN PATENT DOCUMENTS

| | | |
|---|---|---|
| CN | 1828290 A | 9/2006 |
| CN | 1989184 A | 6/2007 |

(Continued)

OTHER PUBLICATIONS

Agnieszka Popielec et al. Effects of cyclodextrins on the chemical stability of drugs. International Journal of Pharmaceutics, vol. 531, Issue 2, Oct. 15, 2017, pp. 532-542 (Year: 2017).*
Search Report received in Great Britain Application No. 1915206.5 dated Apr. 6, 2020, 5 pages.
Search Report received in International Application No. PCT/EP2020/079659 dated Feb. 15, 2021, 5 pages.
Welch et al., "Handbook of Radiopharmaceuticals: Radiochemistry and Applications," Departments Book Review, New York, NY: J. Wiley, 2003, The Journal of Nuclear Medicine, vol. 45, No. 6, Jun. 2004, 2 pages.
Written Opinion received in International Application No. PCT/EP2020/079659 dated Feb. 15, 2021, 9 pages.
Japanese Patent Office, "Notice of Reasons for Rejection", issued in connection to Japanese Application No. 2022-523267, mailed Nov. 7, 2024, 7 pages (English Translation included).

(Continued)

*Primary Examiner* — Michael G. Hartley
*Assistant Examiner* — Samantha L Mejias
(74) *Attorney, Agent, or Firm* — Goodwin Procter LLP

(57) ABSTRACT

The present invention provides a radiopharmaceutical composition comprising the following four components: (i) a radio-labelled compound; (ii) ethanol; (iii) a stabilizer of the radio-labelled compound; and (iv) a cyclodextrin.

The present invention also provides a radiopharmaceutical composition comprising: (i) a radio-labelled compound; (ii) a stabilizer of the radio-labelled compound, wherein the stabilizer comprises: ascorbic acid, aspartic acid, cysteine, maleic acid, gentisic acid, glutathione, glutamic acid, mannitol, nicotinamide, calcium chloride, N-t-butyl-alpha-phenylnitrone (PBN), tartaric acid, para-aminobenzoic acid (pABA), chloride ions or salts or combinations thereof; and (iii) a cyclodextrin.

6 Claims, 1 Drawing Sheet

(56) References Cited

U.S. PATENT DOCUMENTS

| | | |
|---|---|---|
| 11,170,884 B2 | 11/2021 | Rhodes et al. |
| 11,565,257 B2 | 1/2023 | Engell et al. |
| 11,744,906 B2 | 9/2023 | Cesati et al. |
| 12,162,009 B2 | 12/2024 | Engell et al. |
| 2006/0034760 A1 | 2/2006 | Chen et al. |
| 2011/0091374 A1 | 4/2011 | Robinson et al. |
| 2012/0237445 A1* | 9/2012 | Castner ............. A61K 51/0455 424/1.85 |
| 2013/0129623 A1 | 5/2013 | Barnett |
| 2013/0149241 A1 | 6/2013 | Iveson et al. |
| 2013/0183238 A1 | 7/2013 | Kolb et al. |
| 2013/0209358 A1* | 8/2013 | Barnett ................. A61K 49/00 424/1.69 |
| 2013/0266487 A1 | 10/2013 | Osborn |
| 2014/0328757 A1 | 11/2014 | Castner et al. |
| 2015/0079000 A1 | 3/2015 | Chezal et al. |
| 2015/0139902 A1* | 5/2015 | Engell ................. A61K 51/082 424/1.69 |
| 2015/0175553 A1 | 6/2015 | Wouters et al. |
| 2015/0246143 A1 | 9/2015 | El Fakhri et al. |
| 2016/0187304 A1 | 6/2016 | Wikfors et al. |
| 2017/0128597 A1 | 5/2017 | Dyrstad et al. |
| 2017/0266326 A1 | 9/2017 | Radeke et al. |
| 2018/0071411 A1 | 3/2018 | Castner et al. |
| 2019/0055207 A1 | 2/2019 | Okumura et al. |
| 2019/0275182 A1 | 9/2019 | Engell et al. |
| 2019/0365935 A1 | 12/2019 | Castner et al. |
| 2020/0222562 A1 | 7/2020 | Castner et al. |
| 2020/0324002 A1 | 10/2020 | Cesati et al. |
| 2020/0397927 A1 | 12/2020 | Radeke et al. |
| 2021/0187131 A1 | 6/2021 | Castner et al. |
| 2021/0300878 A1 | 9/2021 | Casebier et al. |
| 2022/0165382 A1 | 5/2022 | Rhodes et al. |
| 2022/0339303 A1 | 10/2022 | Radeke et al. |
| 2022/0401591 A1 | 12/2022 | El Fakhri et al. |
| 2023/0022430 A1 | 1/2023 | Mcrobbie et al. |
| 2023/0120841 A1 | 4/2023 | Engell et al. |
| 2024/0100199 A1 | 3/2024 | Cesati et al. |
| 2024/0100200 A1 | 3/2024 | Castner et al. |
| 2024/0302338 A1 | 9/2024 | Clarke et al. |
| 2024/0350683 A1 | 10/2024 | Mcrobbie et al. |
| 2024/0366808 A1 | 11/2024 | Engell et al. |
| 2025/0041859 A1 | 2/2025 | Engell et al. |

FOREIGN PATENT DOCUMENTS

| | | |
|---|---|---|
| CN | 101636368 A | 1/2010 |
| CN | 102858752 A | 1/2013 |
| CN | 103249698 A | 8/2013 |
| CN | 103874672 A | 6/2014 |
| CN | 103958049 A | 7/2014 |
| CN | 107108392 A | 8/2017 |
| CN | 107108393 A | 8/2017 |
| CN | 107261159 A | 10/2017 |
| CN | 110290868 A | 9/2019 |
| CN | 111896656 A | 11/2020 |
| EP | 1690552 A2 | 8/2006 |
| JP | H07503960 | 4/1995 |
| JP | H11508923 A | 8/1999 |
| JP | 2006514915 | 5/2006 |
| JP | 2011513306 A | 4/2011 |
| JP | 2013540702 | 11/2013 |
| JP | 2015518850 A | 7/2015 |
| JP | 2016047824 A | 4/2016 |
| JP | 2016188197 A | 11/2016 |
| JP | 201781847 A | 5/2017 |
| JP | 2017520550 A | 7/2017 |
| JP | 2019167357 A | 10/2019 |
| JP | 2019206533 A | 12/2019 |
| WO | 03092743 A1 | 11/2003 |
| WO | 2005079391 A2 | 9/2005 |
| WO | WO-2007042781 A2 | 4/2007 |
| WO | WO-2010120368 A2 | 10/2010 |
| WO | WO-2011044422 A2 | 4/2011 |
| WO | 2011097649 A2 | 8/2011 |
| WO | 2012021882 A2 | 2/2012 |
| WO | WO-2013079578 | 6/2013 |
| WO | WO-2014020035 A1 | 2/2014 |
| WO | WO-2014026079 A2 * | 2/2014 ......... A61K 49/0004 |
| WO | WO-2016075259 A1 | 5/2016 |
| WO | WO-2016075261 A1 | 5/2016 |
| WO | WO-2016086036 A2 | 6/2016 |
| WO | WO-2017148925 A1 | 9/2017 |
| WO | WO-2018115353 A1 | 6/2018 |
| WO | WO-2019063634 A1 | 4/2019 |
| WO | 2019185932 A1 | 10/2019 |
| WO | WO-2019185933 A1 | 10/2019 |
| WO | WO-2021078814 A1 | 4/2021 |
| WO | WO-2021123073 A1 | 6/2021 |
| WO | WO-2022229155 A1 | 11/2022 |
| WO | WO-2022263592 A1 | 12/2022 |
| WO | WO-2022263594 A1 | 12/2022 |
| WO | WO-2022263595 A1 | 12/2022 |

OTHER PUBLICATIONS

Chinese Patent Office, "First Office Action," regarding Application No. 2020801073362.7, 25 pages, dated Oct. 28, 2023.
Search Report received in German Application No. 1919016.4 dated Jun. 22, 2020, 1 page.
Search Report received in International Application No. PCT/EP2020/086901 dated Mar. 19, 2021, 3 pages.
Written Opinion received in International Application No. PCT/EP2020/086901 dated Mar. 19, 2021, 5 pages.
National intellectual property administration, P.R. China, "First Office Action", issued in connection with Chinese Patent Application No. 202080088749, issued Mar. 29, 2024, 12 pages.
National intellectual property administration, P.R. China, "Search Report", issued in connection with Chinese Patent Application No. 202080088749, issued Mar. 29, 2024, 6 pages.
Japanese Patent Office, "Notice of Reasons for Rejection", issued in connection with Japanese Patent Application No. JP 2022-537278, mailed Oct. 25, 2024, 11 pages.
International Search Report and Written opinion for PCT Patent Application No. PCT/EP2022/061004 mailed Jul. 25, 2022, 7 pages.
Wenping Li et al., "Radiosynthesis of the HIV Integrase Inhibitor [18F] MK-0518 (Isentress)" Journal of Labelled Compounds and Radiopharmaceuticals, vol. 53, No. 7, May 11, 2010, pp. 517-520.
Li Xiaomin et al., "Method Development and Validation for Determination of p-Toluenesulfonoxypropyl-(+)-Dihydrotetrabenazine Enantiomeric Purity by HPLC on a Chiral Stationary Phase," Chromatographia, Vieweg Und Teubner Verlag, DE, vol. 80, No. 3, Jan. 30, 2017, pp. 483-488.
Ory Dieter et al., "Retention of [18F] Fluoride on Reversed Phase HPLC Columns", Journal of Pharmaceutical and Biomedical Analysis, Elsevier B.V, Amsterdam, NL, vol. 111, Apr. 9, 2015, pp. 209-214.
Great Britain Search Report for Application No. GB2105950.6 dated Oct. 19, 2021, 3 pages.
Search Report received in Great Britain Application No. 2108605.3, dated Mar. 30, 2022, 4 pages.
International Search Report and Written Opinion for PCT Application No. PCT/EP2022/066483, dated Sep. 26, 2022, 17 pages.
Purohit, A, et al., "Synthesis and Biological Evaluation of Pyridazinone Analogues as Potential Cardiac Positron Emission Tomography Tracers," J. Med. Chem., vol. 51, 17 pages, dated Apr. 19, 2008.
Great Britain Intellectual Property Office, "Search Report," regarding GB Application No. 2108608.7, dated Mar. 24, 2022, 3 pages.
International Search Report and Written Opinion for PCT Application No. PCT/EP2022/066481, dated Sep. 19, 2022, 9 pages.
Office Action received in Japanese Application No. 2020-552212 dated Apr. 12, 2023, with translation, 7 pages.
Great Britain Search Report received in Application No. GB1805253.0 dated Nov. 20, 2018, 4 pages.
International Search Report and Written Opinion for PCT Application No. PCT/EP2019/058112, dated May 24, 2019, 10 pages.

(56) References Cited

OTHER PUBLICATIONS

Office Action received in Chinese Application No. 201980036252.0 dated Oct. 26, 2022, with translation, 24 pages.
Office Action (Notice of Preliminary Rejection) received in Korean Patent Application No. 10-2022-7016678 mailed Jul. 30, 2025, 8 pages.
Office Action (Notice of Reasons for Rejection) received in Japanese Patent Application No. 2022-523267 mailed May 13, 2025, 6 pages (with English Translation).

* cited by examiner

USE OF CYCLODEXTRINS AS A RADIOSTABILIZER

FIELD OF THE INVENTION

The present invention generally relates to radiopharmaceutical compositions, which comprise a radio-labelled compound and are stabilized with a stabilizer and cyclodextrin as a co-stabilizer. The invention also relates to the use of such radiopharmaceutical compositions in methods of imaging a subject using the radiopharmaceutical compositions. Also described are methods and kits for the preparation of the radiopharmaceutical compositions.

BACKGROUND TO THE INVENTION

Stabilizers are needed in radiopharmaceutical preparations to reduce the formation of radioimpurities during their shelf life.

Conventional radiopharmaceuticals contain a radiopharmaceutical, a gas, and a formulation that contains a solvent and a stabilizer. Commonly used stabilizers include ethanol, sodium ascorbate, ascorbic acid, maleic acid, gentisic acid and calcium chloride among others.

Cyclodextrins have previously been used to improve the solubility of poorly water soluble substances.

DESCRIPTION OF THE INVENTION

In one aspect, the present invention provides a radiopharmaceutical composition comprising the following four components: (i) a radio-labelled compound comprising a $^{18}$F-labelled radiopharmaceutical, or a pharmaceutically acceptable salt thereof; (ii) ethanol; (iii) a stabilizer of the radio-labelled compound wherein said stabilizer comprises ascorbic acid; and (iv) a co-stabilizer of the radio-labelled compound wherein said co-stabilizer is a cyclodextrin.

The following subject-matter is provided in combination with the aspect provided above and the additional aspects provided below.

The term radiopharmaceutical has its conventional meaning, and refers to a radioactive compound suitable for in vivo mammalian administration for use in diagnosis or therapy.

The radiopharmaceutical compositions described herein may comprise components as described in US2013129623.

The radio-labelled compound comprises a $^{18}$F-labelled radiopharmaceutical, or a pharmaceutically acceptable salt thereof. Examples of such $^{18}$F-labelled radiopharmaceuticals include [$^{18}$F]FDG, [$^{18}$F]FMAU, [$^{18}$F]FMISO, [$^{18}$F]FHBG, [$^{18}$F]AV-45, [$^{18}$F]AV-19, [$^{18}$F]AV-1, [$^{18}$F] Flutemetamol, [$^{18}$F] Flurpiridaz, [$^{18}$F]K5, [$^{18}$F]HX4, [$^{18}$F]W372, [$^{18}$F]VM4-037, [$^{18}$F]CP18, [$^{18}$F]ML-10, [$^{18}$F]T808, [$^{18}$F]T807, 2-[$^{18}$F]fluoromethyl-L-phenylalanine, or combinations thereof. Preferably, the radio-labelled compound is not [$^{18}$F]FLT.

The radio-labelled compound may comprise a compound of Formula (I):

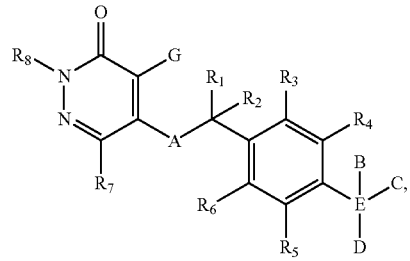

Formula (I)

wherein A is selected from N(R$^7$), S, O, C(=O), C(=O)O, NHCH$_2$CH$_2$O, a bond, or C(=O)N(R$^7$);
when present, B is selected from hydrogen, alkoxyalkyl, alkyloxy, aryl, C$_1$-C$_6$ alkyl optionally substituted with an imaging moiety, heteroaryl, and an imaging moiety;
when present, C is selected from hydrogen, alkoxyalkyl, alkyloxy, aryl, C$_1$-C$_6$ alkyl optionally substituted with an imaging moiety, heteroaryl, and an imaging moiety;
D is selected from hydrogen, alkoxyalkyl, alkyloxy, aryl, C$_1$-C$_6$ alkyl optionally substituted with an imaging moiety, heteroaryl, and an imaging moiety; or
C and D, together with the atom to which they are attached, form a three- or four-membered carbocyclic ring;
G is halo or haloalkyl;
n is 0, 1, 2, or 3;
R$^1$, R$^2$, R$^3$, R$^4$, R$^5$, R$^6$ and R$^7$ are independently selected from hydrogen, C$_1$-C$_6$ alkyl optionally substituted with an imaging moiety, and an imaging moiety;
R$^8$ is C$_1$-C$_6$ alkyl, optionally substituted with an imaging moiety; and
E is selected from a bond, carbon, and oxygen, provided that when E is a bond, B and C are absent and D is selected from aryl and heteroaryl, and provided that when E is oxygen, B and C are absent and D is selected from hydrogen, alkoxyalkyl, aryl, C$_1$-C$_6$ alkyl optionally substituted with an imaging moiety, and heteroaryl;
provided that the imaging moiety comprises $^{18}$F and at least one imaging moiety is present in Formula (I).

Substituent A of Formula (I) may be O. R$^8$ may be tert-butyl. G may be chloro.

Compounds of Formula (I) and how to obtain them can be found for example in WO2005079391A2, the contents of which is incorporated herein by reference.

The radio-labelled compound may comprise flurpiridaz, which has the following structure:

By the term "stabilizer" it is specifically meant radiostabilizer, which is a compound that inhibits degradation reactions, such as redox processes, by trapping highlyreactive free radicals, such as oxygen-containing free radicals arising from the radiolysis of water. The stabilizers of the invention protect the radio-labelled compound(s) from radiolysis and therefore lower/prevent a drop in the purity of the radio-labelled compound(s) over their shelf life. By the term "co-stabilizer" is meant a compound that enhances the desired effects of the stabilizer.

Radiochemical purity (RCP) is determined using radio TLC or HPLC and can be defined as the ratio of the (radio-labelled) drug substance peak to the total (radio-labelled) peaks in the chromatogram. If one manufactures a radiopharmaceutical with high radioactive concentration (RAC), the drop in RCP during storage is likely to be higher than at lower RAC due to more radiolysis. High radioactivity results in the drug substance destroying itself (i.e. radiolysis). The most efficient stabilizer can be identified by preparing different formulations of radiopharmaceuticals at similar RAC and comparing the drop in RCP over time, typically 8-10 hours for $^{18}$F compounds. The radiopharmaceutical preparation with the smallest drop in RCP during storage has the most effective stabilizer for that specific drug substance.

In some cases, ethanol can be considered to be a stabilizer. Further stabilizers include ascorbic acid, aspartic acid, cysteine, maleic acid, gentisic acid, glutathione, glutamic acid, mannitol, nicotinamide, calcium chloride, N-t-butyl-alpha-phenylnitrone (PBN), tartaric acid and para-aminobenzoic acid (pABA), chloride ions or salts or combinations thereof. The stabilizer of the present invention comprises ascorbic acid. Ethanol may comprise up to 10% (v/v) ethanol in aqueous solution. Preferably, pharmaceutical grade material is used.

The cyclodextrin may comprise: α-cyclodextrin, β-cyclodextrin or γ-cyclodextrin, or pharmaceutically acceptable derivatives or combinations thereof. The cyclodextrin may comprise β-cyclodextrin. The cyclodextrin may comprise hydroxypropyl-beta-cyclodextrin (HPbCD). In the context of the present invention the cyclodextrin is a co-stabilizer.

The radiopharmaceutical composition may comprise a biocompatible carrier. The biocompatible carrier is a fluid, especially a liquid, in which the radiopharmaceutical can be suspended or preferably dissolved, such that the composition is physiologically tolerable, i.e. can be administered to the mammalian body without toxicity or undue discomfort. The biocompatible carrier is suitably an injectable carrier liquid such as sterile, pyrogen-free water for injection; an aqueous solution such as saline (which may advantageously be balanced so that the final product for injection is isotonic); an aqueous buffer solution comprising a biocompatible buffering agent (e.g. phosphate buffer); an aqueous solution of one or more tonicity-adjusting substances (e.g. salts of plasma cations with biocompatible counterions), sugars (e.g. glucose or sucrose), sugar alcohols (e.g. sorbitol or mannitol), glycols (e.g. glycerol), or other non-ionic polyol materials (e.g. polyethyleneglycols, propylene glycols and the like). Preferably, the biocompatible carrier is pyrogen-free water for injection, isotonic saline or phosphate buffer.

The radiopharmaceutical composition may be in a form suitable for mammalian administration. By the phrase "in a form suitable for mammalian administration" it is meant a composition which is sterile, pyrogen-free, lacks compounds which produce toxic or adverse effects, and is formulated at a biocompatible pH (approximately pH 4.0 to 10.5, preferably 4.5 to 9.5, more preferably 4.5 to 7.5 for the agents of the present invention) and physiologically compatible osmolality. Such compositions lack particulates that could risk causing emboli in vivo, and are formulated so that precipitation does not occur on contact with biological fluids (e.g. blood). Such compositions also contain only biologically compatible excipients, and are preferably isotonic.

Preferably, the mammal is an intact mammalian body in vivo, and is more preferably a human subject. Preferably, the radiopharmaceutical can be administered to the mammalian body in a minimally invasive manner, i.e. without a substantial health risk to the mammalian subject even when carried out under professional medical expertise. Such minimally invasive administration is preferably intravenous administration into a peripheral vein of said subject, without the need for local or general anaesthetic.

In a particular embodiment of the present invention, the stabilizer comprises ascorbic acid and ethanol, the cyclodextrin comprises hydroxypropyl-beta-cyclodextrin (HPbCD) and the radio-labelled compound comprises flurpiridaz. The ascorbic acid can be in an amount from about 1 to about 100 mg/mL, the ethanol can be in an amount from about 2 to about 10% (v/v) and the HPbCD can be in an amount of from about 1 to about 100 mg/mL.

In one embodiment of the present invention ascorbic acid is present in an amount from 1 to about 100 mg/mL, for example from about 30 to about 50 mg/mL.

In one embodiment of the present invention HPbCD is present in an amount of from about 1 to about 100 mg/mL, or from about 40 to about 50 mg/mL, for example from about 40 to about 47 mg/ml.

In one embodiment of the present invention ethanol is present in an amount from about 2 to about 10% (v/v), or from about 5 to about 10% (v/v), for example 7% (v/v).

In another aspect, the present invention provides the use of a cyclodextrin as a co-stabilizer in a radiopharmaceutical composition. The definitions of cyclodextrin and radiopharmaceutical composition for this aspect are the same as provided above.

The radiopharmaceutical composition may comprise a radio-labelled compound, wherein the radio-labelled compound is not [$^{18}$F]FLT.

The invention also provides a method of imaging a subject using the radiopharmaceutical composition described above.

The invention also provides the radiopharmaceutical composition described above for use in positron emission tomography (PET) imaging.

In another aspect, the present invention provides a method of preparation of a radiopharmaceutical composition comprising combining the following four components: (i) a radio-labelled compound comprising a $^{18}$F-labelled radiopharmaceutical, or a pharmaceutically acceptable salt thereof; (ii) ethanol; (iii) a stabilizer of the radio-labelled compound wherein said stabilizer comprises ascorbic acid; and (iv) a co-stabilizer of the radio-labelled compound wherein said co-stabilizer is a cyclodextrin.

In a further aspect, the present invention provides a kit for the preparation of a radiopharmaceutical composition, comprising: the following four components: (i) a precursor compound for the production of a radio-labelled compound comprising a $^{18}$F-labelled radiopharmaceutical, or a pharmaceutically acceptable salt thereof; (ii) ethanol; (iii) a stabilizer of the radio-labelled compound; and (iv) a co-stabilizer of the radio-labelled compound wherein said co-stabilizer is a cyclodextrin.

A "precursor compound" comprises a non-radioactive derivative of a radiolabelled compound, designed so that chemical reaction with a convenient chemical form of an in vivo-detectable label occurs site-specifically; can be conducted in the minimum number of steps (ideally a single step); and without the need for significant purification (ideally no further purification), to give the desired in vivo imaging agent. Such precursor compounds are synthetic and can conveniently be obtained in good chemical purity. In one embodiment the precursor compound is a non-radioactive derivative of the $^{18}$F-labelled radiopharmaceutical that includes a leaving group, which is replaced with $^{18}$F upon reaction of the precursor compound with a suitable source of $^{18}$F-fluoride.

The term "leaving group" refers to an atom or group of atoms that is displaced as a stable species during a substitution or displacement radiofluorination reaction. Suitable leaving groups include halogens and sulfonate-containing leaving groups. Specific examples of suitable leaving groups include iodide, bromide, chloride, mesylate, triflate, tosylate, nosylate or 1,2-cyclic sulfate.

The term "suitable source of $^{18}$F-fluoride" refers to F-8-fluoride in a chemical form suitable for displacing a leaving group in a nucleophilic substitution reaction to result in the $^{18}$F-labelled radiopharmaceutical. $^{18}$F-fluoride is normally obtained as an aqueous solution from the nuclear reaction $^{18}$O(p,n)$^{18}$F and is made reactive by the addition of a cationic counterion and the subsequent removal of water. Suitable cationic counterions should possess sufficient solubility within the anhydrous reaction solvent to maintain the solubility of $^{18}$F. Suitable counterions include large but soft metal ions such as rubidium or caesium, potassium complexed with a cryptand such as Kryptofix™ 222 (K222), or tetraalkylammonium salts. A suitable tetraalkylammonium salt is tetrabutylammonium hydrogen carbonate. A detailed discussion of well-known $^{18}$F labelling techniques can be found in Chapter 6 of the "Handbook of Radiopharmaceuticals" (2003; John Wiley and Sons: M. J. Welch and C. S. Redvanly, Eds.).

Where the $^{18}$F-radiopharmaceutical composes $^{18}$F-flurpiridaz the precursor compound may be the following compound:

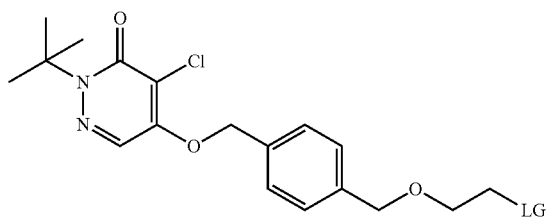

Wherein LG is a leaving group as defined hereinabove. More detail on obtaining this precursor compound, labelling it to obtain $^{18}$F-flurpiridaz, and suitable kit presentations can be found for example in WO2019185932A1 and WO2011097649A2, the contents of which are incorporated herein by reference.

The radiopharmaceutical composition may contain additional optional excipients. For example, such additional optional excipients include: an antimicrobial preservative, pH-adjusting agent, filler, solubiliser or osmolality adjusting agent.

By the term "antimicrobial preservative" is meant an agent which inhibits the growth of potentially harmful micro-organisms such as bacteria, yeasts or moulds. The antimicrobial preservative may also exhibit some bactericidal properties, depending on the dosage employed. The main role of the antimicrobial preservative(s) of the present invention is to inhibit the growth of any such microorganism in the pharmaceutical composition. The antimicrobial preservative may, however, also optionally be used to inhibit the growth of potentially harmful micro-organisms in one or more components of kits used to prepare said composition prior to administration. Suitable antimicrobial preservative(s) include: the parabens, i.e. methyl, ethyl, propyl or butyl paraben or mixtures thereof; benzyl alcohol; ethanol, phenol; cresol; cetrimide and thiomersal. Preferred antimicrobial preservative(s) are the parabens or ethanol.

The term "pH-adjusting agent" means a compound or mixture of compounds useful to ensure that the pH of the composition is within acceptable limits (approximately pH 4.0 to 10.5, preferably 4.5 to 9.5, more preferably 4.5 to 7.5 for the agents of the present invention) for human or mammalian administration. Suitable such pH-adjusting agents include pharmaceutically acceptable buffers, such as tricine, phosphate, acetate or TRIS [i.e. tris(hydroxymethyl) aminomethane], and pharmaceutically acceptable bases such as sodium carbonate, sodium bicarbonate or mixtures thereof. When the composition is employed in kit form, the pH adjusting agent may optionally be provided in a separate vial or container, so that the user of the kit can adjust the pH as part of a multi-step procedure.

By the term "filler" is meant a pharmaceutically acceptable bulking agent which may facilitate material handling during production and lyophilisation. Suitable fillers include inorganic salts such as sodium chloride, and water soluble sugars or sugar alcohols such as sucrose, maltose, mannitol or trehalose.

By the term "solubiliser" is meant an additive present in the composition which increases the solubility of the radiopharmaceutical in the solvent. A preferred such solvent is aqueous media, and hence the solubiliser preferably improves solubility in water. Suitable such solubilisers include: $C_{1-4}$ alcohols; glycerine; polyethylene glycol (PEG); propylene glycol; polyoxyethylene sorbitan monooleate; sorbitan monooloeate; polysorbates (e.g. Tween™); poly(oxyethylene)poly(oxpropylene)poly(oxyethylene) block copolymers (Pluronics™); cyclodextrins (e.g. alpha, beta or gamma cyclodextrin, hydroxypropyl-β-cyclodextrin or hydroxypropyl-γ-cyclodextrin) and lecithin.

Preferred solubilisers are cyclodextrins, $C_{1-4}$ alcohols, polysorbates and Pluronics™, more preferably cyclodextrins and $C_{2-4}$ alcohols. When the solubiliser is an alcohol, it is preferably ethanol or propanol, more preferably ethanol. Ethanol has potentially several roles, since it can also function as a biocompatible carrier, radioprotectant or anti-microbial preservative. When the solubiliser is a cyclodextrin, it is preferably a gamma cyclodextrin, more preferably hydroxypropyl-β-cyclodextrin (HPbCD). The concentration of cyclodextrin can be from about 0.1 to about 50 mg/ml, preferably between about 5 and about 50 mg/ml, more preferably 25 to 50 mg/ml, most preferably between about 40 and about 50 mg/ml.

The present inventors have found that the use of cyclodextrin as co-stabilizer improves the stability of a radiopharmaceutical compared to using a conventional stabilizer. By adding a cyclodextrin to a radiopharmaceutical formulation, one gets the added value of a more radiochemically stable product, as well as a more physically stable product that is more compatible with plastic contact materials (tubing, sterilising filters, syringes etc.). If the active substance is poorly water soluble, this is even more beneficial.

Calcium disodium edetate may also be used as an additional optional excipient.

Figure 1:
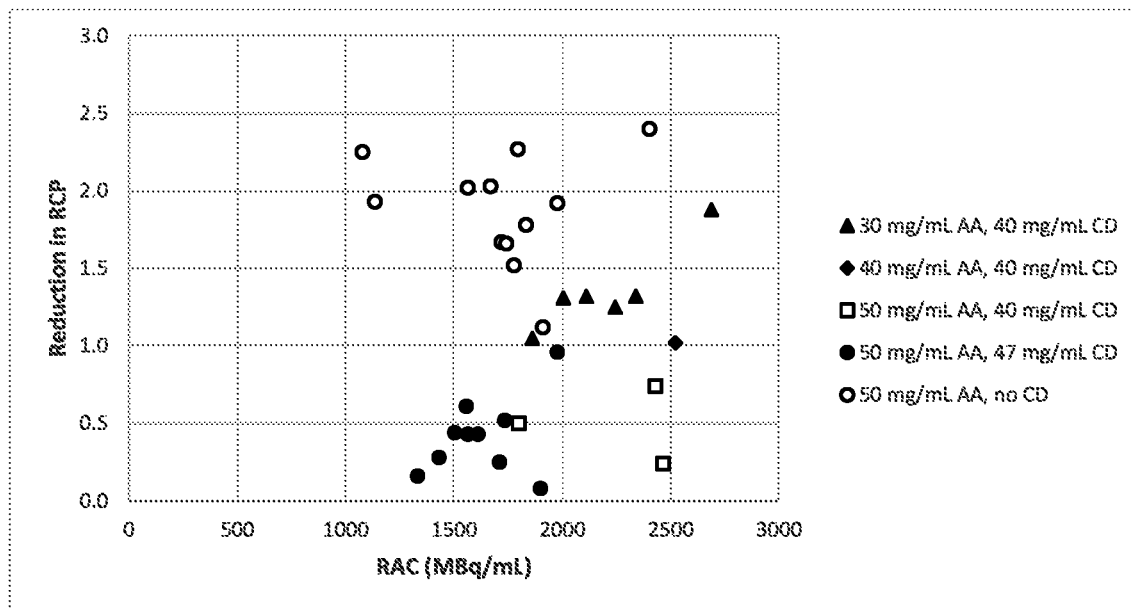
FIG. 1 shows the results of radiochemical purity (RCP) testing of various radiopharmaceutical compositions as a function of radioactive concentration (RAC).

As shown in FIG. 1, the RCP is more stable over 10 hours when HPbCD is present in the ascorbic acid formulation than without HPbCD.

The radiostability of [$^{18}$F]flurpiridaz is equal or better when prepared with 30 mg/mL ascorbic acid and 40 mg/mL HPbCD than when prepared with 50 mg/mL ascorbic acid without HPbCD. The HPbCD also improves the aqueous solubility of flurpiridaz and reduces the risk of incompatibility with consumer materials (e.g., tubing, sterilising filters, syringes etc.).

Figure 2:
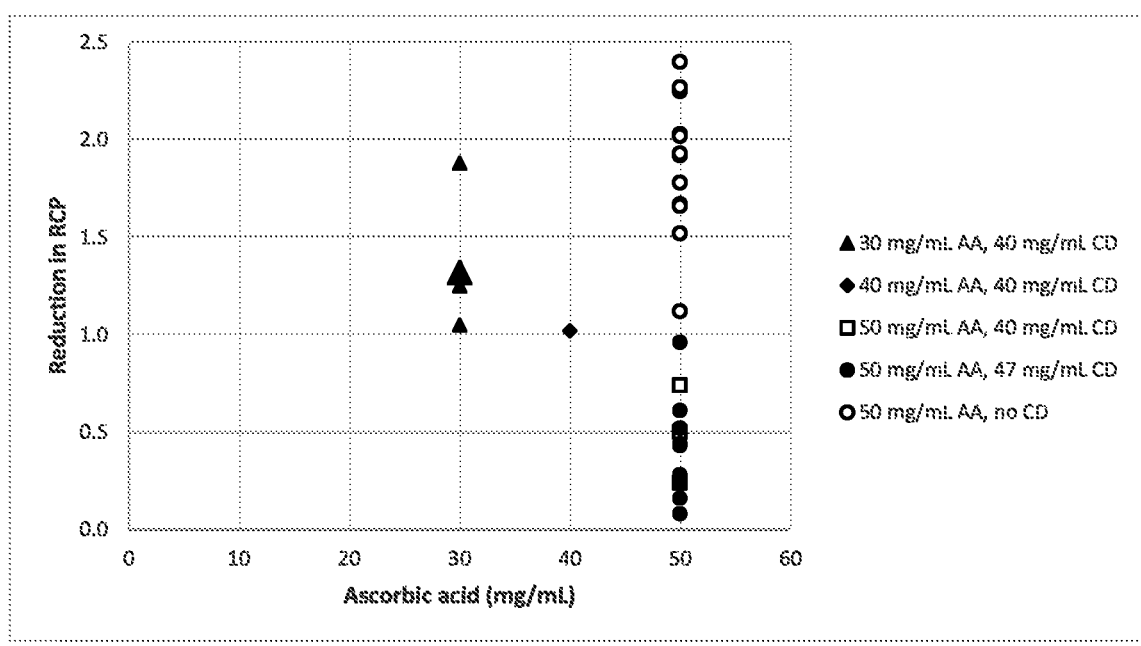
FIG. 2 shows the results of radiochemical purity (RCP) testing of various radiopharmaceutical compositions as a function of ascorbic acid concentration.

As shown in FIG. 2, reduction in RCP is observed over 4 to 10 h when [$^{18}$F]flurpiridaz is formulated with 30 to 50 mg/mL ascorbic acid (pH ~6) with or without 40-47 mg/mL HPbCD. All samples contain ca. 7% (v/v) ethanol and are held under 0-21% (v/v) oxygen headspace gas.

The invention is described with reference to the following non limiting examples.

EXAMPLE 1: RADIOSYNTHESIS OF [$^{18}$F]FLURPIRIDAZ WITH SPE PURIFICATION

[$^{18}$F]fluoride (ca. 200 GBq) was produced using a GE Medical Systems PETtrace cyclotron with a silver target via the [$^{18}$O](p,n) [$^{18}$F] nuclear reaction. Total target volumes of 3.2-4.8 mL were used. The radiofluoride was trapped on a Waters QMA cartridge (pre-conditioned with carbonate), and the fluoride was eluted with a solution of tetrabutylammonium hydrogen carbonate (22 mg) in water (100 μL) and acetonitrile (400 μL). Nitrogen was used to drive the solution off the QMA cartridge to the reaction vessel. The [$^{18}$F]fluoride was dried for ca. 15 minutes at 110-120° C. under a steady stream of nitrogen and vacuum. The precursor (10.2 mg) in MeCN (1.7 mL) was added to the dried [$^{18}$F]fluoride and the reaction mixture was heated at 110 C for 3 minutes. The crude product was then hydrolysed with a solution of NaOH (2 M, 2.3 mL). The hydrolysed crude product was then loaded onto a tC18 SPE cartridge (Waters, product number WAT036800) and purified using the method described below.

The SPE cartridge was washed with ascorbic acid (21 mL) to wash away the acetonitrile, NaOH and hydrophilic chemical and radiochemical impurities. Then the SPE cartridge was washed with a 40% acetonitrile solution in water (11.9 mL) to remove the hydroxy impurity. After this, the first SPE cartridge was connected in series to a second SPE cartridge (Waters, product number WAT036800) and the two were washed in series with 40% acetonitrile solution in water (22.2 mL) followed by a stream of nitrogen to transfer [$^{18}$F]Flurpiridaz onto the second cartridge and trap the more lipophilic chemical and radiochemical impurities on the first SPE cartridge. The second SPE cartridge was washed with a 40% acetonitrile solution in water (5.1 mL) followed by ascorbic acid (21 mL) to remove the acetonitrile. The product was then eluted off the second SPE cartridge with a 45% ethanolic solution (9 mL, first 2 mL not collected) to elute [$^{18}$F]Flurpiridaz into the product vial.

The first 45 mL product vial was composed of water (42 mL), ethanol (3 mL), calcium disodium edetate (0.25 mg/mL), ascorbic acid (50 mg/mL) and sodium hydroxide (7.5 mg/mL). The second 45 mL product vial was composed of water (42 mL), ethanol (3 mL), calcium disodium edetate (0.25 mg/mL), ascorbic acid (50 mg/mL), hydroxypropyl-beta-cyclodextrin (45 mg/mL; HPbCD) and sodium hydroxide (7.5 mg/mL).

The non-decay corrected yield was 41-44%, resulting in a product with an RAC of ca. 1800 MBq/mL (Table 1). The RCP of the final product was 96-98%.

After 2 hours the RCP decreased by 0.8-1.4% with the formulation vial not containing HPbCD or 0.3-0.4% with the formulation vial containing HPbCD (Table 1). After 4 hours the RCP decreased by 1.1-1.7% with the formulation vial not containing HPbCD or 0.6% with the formulation vial containing HPbCD. As the specification for RCP was 95% at end of shelf-life (8-10 hours), the batch failed when HPbCD was excluded from the formulation.

Furthermore, when HPbCD is used in the formulation, the starting activity can be increased to 350 GBq with a product RAC of ca. 2500 MBq/mL. The RCP is 96-98% with a ca. 0.5-1.3% decrease in RCP over 8-10 hours.

TABLE 1

Representative formulated products of [$^{18}$F]Flurpiridaz with and without hydroxypropyl-beta-cyclodextrin (HPbCD).

| Formulation | Starting activity (MBq) | RAC (MBq/ mL) | [$^{18}$F]fluoride T = 0 h | [$^{18}$F]fluoride T = 4 h | RCP T = 0 h | RCP T = 4 h |
|---|---|---|---|---|---|---|
| Without HPbCD | 190279 | 1742 | <0.3 | 0.4 | 97.4 | 95.7 |
| Without HPbCD | 200127 | 1911 | 0.3 | 0.5 | 96.1 | 95.0 |
| With HPbCD | 202606 | 1976 | <0.3 | <0.3 | 97.7 | 97.1 |
| With HPbCD | 202902 | 1971 | <0.3 | <0.3 | 97.4 | 96.8 |

As shown above, the present inventors have found that the use of cyclodextrin as co-stabilizer improves the radiostability of a radiopharmaceutical composition compared to using a conventional radiostabilizer alone, e.g. ascorbic acid, or radiostabilizing system, e.g. ascorbic acid and ethanol.

The invention claimed is:

1. A radiopharmaceutical composition, comprising:
   (i) a radio-labelled compound selected from [$^{18}$F] flurpiridaz, and a pharmaceutically acceptable salt thereof;
   (ii) ethanol in an amount from about 5 to about 10% (v/v);
   (iii) ascorbic acid in an amount from about 30 to about 50 mg/mL, wherein the ascorbic acid is a stabilizer of the radio-labelled compound; and
   (iv) hydroxypropyl-beta-cyclodextrin (HPbCD) in an amount of from about 40 to about 47 mg/mL, wherein HPbCD is a co-stabilizer of the radio-labelled compound.

2. A method of imaging a subject in need thereof, comprising:
   intravenously administering the radiopharmaceutical composition of claim 1; and acquiring an at least one image from the subject after the administration.

3. A method of positron emission tomography (PET) imaging in a subject in need thereof, comprising intravenously administering the radiopharmaceutical composition of claim 1; and acquiring at least one PET image from the subject after the administration.

4. The radiopharmaceutical composition of claim 1, wherein the ethanol is present in an amount of 7% (v/v).

5. The radiopharmaceutical composition of claim 1, wherein the pH of the composition is 4.5 to 9.5.

6. A stable radiopharmaceutical composition suitable for mammalian administration comprising:
[$^{18}$F] flurpiridaz;
about 7% ethanol;
about 30 to about 50 mg/mL ascorbic acid; and
about 40 to about 47 mg/mL hydroxypropyl-beta-cyclodextrin (HPbCD), wherein the radio chemical purity of the stable radiopharmaceutical composition at 8 hours is 95% or more as measured by HPLC.

* * * * *